(12) United States Patent
Yamaguchi

(10) Patent No.: US 6,466,855 B2
(45) Date of Patent: Oct. 15, 2002

(54) VEHICLE SPEED ESTIMATING APPARATUS AND METHOD AND VEHICULAR CONTROL APPARATUS AND METHOD

(75) Inventor: Katsuyuki Yamaguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/899,914

(22) Filed: Jul. 9, 2001

(65) Prior Publication Data

US 2002/0007243 A1 Jan. 17, 2002

(30) Foreign Application Priority Data

Jul. 14, 2000 (JP) .......................................... 2000-213702

(51) Int. Cl.$^7$ .............................. G06F 13/00; G05D 1/00
(52) U.S. Cl. .............................. 701/70; 701/69; 701/74; 701/89; 180/197; 180/233; 180/234; 303/170; 303/190
(58) Field of Search .............................. 701/70, 74, 89, 701/69, 75, 82, 88; 180/197, 233, 249, 247, 248, 234; 303/170, 172, 190, 173

(56) References Cited

U.S. PATENT DOCUMENTS

| 4,417,641 A | * | 11/1983 | Kageyama ................... 180/233 |
| 4,702,337 A | * | 10/1987 | Burckhardt et al. ......... 180/197 |
| 4,792,010 A | * | 12/1988 | Kitao et al. .................. 180/233 |
| 5,065,327 A | * | 11/1991 | Yahagi et al. ............... 303/170 |
| 5,414,628 A | * | 5/1995 | Yoshino ....................... 303/172 |
| 5,913,377 A | | 6/1999 | Ota et al. ..................... 180/244 |
| 5,947,224 A | * | 9/1999 | Kouno ......................... 180/233 |

FOREIGN PATENT DOCUMENTS

| EP | 522565 A2 | * | 1/1993 | ............. B60T/8/32 |
| JP | 10-230837 A | | 9/1998 | |

* cited by examiner

Primary Examiner—Jacques H. Louis-Jacques
(74) Attorney, Agent, or Firm—Oliff & Berridge, PLC

(57) ABSTRACT

An apparatus and a method for estimating a vehicle speed of a vehicle in which a driving state can be switched between a four-wheel drive (4WD) state and a two-wheel drive (2WD) state. The driving state of the vehicle can be determined based on one or more pieces of information. A controller calculates the vehicle speed based on a wheel speed of at least one non-driven wheel when it is determined that the vehicle is in the 2WD state. When it is determined that the vehicle is not in the 2WD state or when it cannot be determined that the vehicle is in the 2WD state, the controller calculates the vehicle speed based on the lowest one and/or the second lowest one of the wheel speeds of all of the wheels. Further, an apparatus and method for performing predetermined control, such as behavior control or traction control, that perform the control by using the estimated vehicle speed.

24 Claims, 3 Drawing Sheets

VEHICLE SPEED ESTIMATING APPARATUS AND METHOD AND VEHICULAR CONTROL APPARATUS AND METHOD

INCORPORATION BY REFERENCE

The disclosure of Japanese Patent Application No. 2000-213702 filed Jul. 14, 2000 including the specification, drawings and abstract is incorporated by reference in its entirety.

BACKGROUND OF THE INVENTION

1. Field of Invention

The invention relates to vehicle speed estimating apparatus and method of a motor vehicle, and, more particularly, to vehicle speed estimating apparatus and method for estimating a vehicle speed based on wheel speeds, and a vehicular control apparatus that performs control based on the estimated vehicle speed.

2. Description of Related Art

A known example of vehicle speed estimating apparatus for estimating a vehicle speed of a four-wheel drive (4WD) vehicle is disclosed in U.S. Pat. No. 5,913,377 (corresponding to JP-A-10-230837). The known vehicle speed estimating apparatus estimates a vehicle speed based on the lowest one of wheel speeds of all of the wheels. In a two-wheel-drive (2WD) vehicle, it is known to estimate a vehicle speed based on the wheel speeds of non-driven wheels.

According to the vehicle speed estimating apparatus and method as described above, the vehicle speed is estimated based on the wheel speed(s) that is/are less likely to be influenced by a slip of a wheel or wheels. Therefore, the vehicle speed can be estimated with improved accuracy as compared with the case where the vehicle speed is estimated without taking the influence of a slip of the wheel(s) into account.

In some types of four-wheel drive vehicles, the driving state can be switched between a 4WD state and a 2WD state. In order to accurately estimate a vehicle speed with minimum influence caused by any slip of a wheel(s), it is necessary to determine whether the vehicle is in the 4WD state or the 2WD state, and select the wheel speed(s) as the basis for the estimated vehicle speed, depending upon the result of the determination. Accordingly, if the result of determination on the driving state of the vehicle differs from the actual driving state, or if the driving state cannot be identified or is not clear, the vehicle speed cannot be estimated with high accuracy.

For example, when the vehicle is actually in the 4WD state, but the vehicle speed estimating apparatus determines that the vehicle is in the 2WD, state, i.e., due to a failure or abnormality in a signal communication system or a driving state switching device, the vehicle speed is estimated based on the wheel speeds of the wheels that are actually driven wheels but are regarded as non-driven wheels, even though the vehicle speed must be estimated based on the lowest one of the wheel speeds of all of the wheels. As a result, the vehicle speed is estimated to be higher than an actual value thereof.

The invention was developed in view of the above-described problem encountered in vehicles in which the driving state can be switched between the 4WD and 2WD states, in the case where a vehicle speed is estimated according to the known vehicle speed estimating apparatus or method. Thus, the invention mainly aims at estimating a vehicle speed with improved accuracy even when the actual driving state of the vehicle is different from a result of determination on the driving state, or when the driving state of the vehicle cannot be identified or is not clear. Accordingly, the estimating apparatus and method according to the invention estimates a vehicle speed when the driving state is not determined as a selected-wheel driving state, e.g., 2WD state, in which some of the wheels are driven wheels, in the same manner as in the case where the driving state is determined as an all-wheel driving state, e.g., 4WD state, in which all of the wheels are driven wheels.

For example, there are situations where certain control is performed using the estimated vehicle speed in a vehicle in which the driving state can be switched between the 4WD state and the 2WD state. The control may be, for example, braking-force behavior control under which a braking force is applied to a certain wheel or wheels when the vehicle behaves in an unfavorable or undesirable fashion, so as to stabilize the vehicle behavior. In this case, if the vehicle speed is estimated to be higher than an actual value thereof, the behavior control may be undesirably applied in a situation where it should not be applied, or may fail to be terminated in a situation where it should be terminated. Another example of control is traction control that is executed upon an excessive slip of a wheel or wheels, for suppressing the slip by applying braking force to the wheel (s). If the vehicle speed is estimated to be higher than an actual value thereof, and the traction control is performed based on the estimated vehicle speed, the traction control may not be started in a situation where it should be started, or may be terminated in a situation where it should not be terminated.

SUMMARY OF THE INVENTION

It is therefore an object of the invention to provide an apparatus and a method for estimating a vehicle speed with improved accuracy based on wheel speeds, even when the actual driving state of the vehicle is different from a result of determination on the driving state, or when the driving state of the vehicle cannot be identified or is not clear.

It is another object of the invention to provide vehicular control apparatus and method for performing predetermined control more appropriately, based on the estimated vehicle speed.

To accomplish the above and/or other object(s), one aspect of the invention provides an apparatus for estimating a vehicle speed of a vehicle in which a driving state can be switched between an all-wheel driving state, i.e., all of the wheels of the vehicle are driven wheels, and a selected-wheel driving state in which a first group of wheels are driven wheels and a second group of wheels are non-driven wheels. A controller of the apparatus determines the driving state of the vehicle, and calculates the vehicle speed based on a wheel speed of at least one of the non-driven wheels when it is determined that the driving state is the selected-wheel driving state. When it is determined that the driving state is not the selected-wheel driving state or when it cannot be determined that the driving state is the selected-wheel driving state, the controller calculates the vehicle speed based on at least a wheel speed of at least one of the wheels of the vehicle. The number of the at least one of the wheels is equal to or smaller than that of the non-driven wheels, as represented by "N", and the at least one of the wheels has the lowest to the Nth lowest one of the wheel speeds of all of the wheels.

The vehicle speed estimating apparatus is able to estimate the vehicle speed with improved accuracy, when the vehicle is actually in the all-wheel driving state, but the controller determines that the vehicle is in the selected-wheel driving state due to, for example, a failure or abnormality in a signal communication system, or a driving state switching device, or the like. In this case, the vehicle speed is estimated based on at least a wheel speed of at least one wheel whose number is equal to or smaller than that of non-driven wheels as represented by "N", and which has the lowest to the Nth lowest one of the wheel speeds of all of the wheels. Accordingly, a situation can be avoided where the vehicle speed is estimated based on the speeds of wheels that are actually driven wheels but are falsely judged as non-driven wheels, and where the vehicle speed is estimated to be higher than an actual value because of the misjudgment.

Another aspect of the invention provides an apparatus and a method for performing predetermined control on a vehicle in which a driving state can be switched between an all-wheel driving state in which all of the wheels of the vehicle are driven wheels, and a selected-wheel driving state in which a first group of wheels are driven wheels and a second group of wheels are non-driven wheels. A controller of the apparatus estimates the vehicle speed in the same manner as described above with respect to the vehicle speed estimating apparatus and method, and performs the predetermined control by using the estimated vehicle speed.

The control apparatus constructed according to the above aspect of the invention is able to estimate the vehicle speed with improved accuracy, as in the case of the vehicle speed estimating apparatus as described above. Thus, there are reduced possibilities that a predetermined control is unexpectedly applied in a situation where it should not be applied, the predetermined control fails to be terminated in a situation where it should be terminated, the predetermined control fails to be applied when it should be applied, and the predetermined control is unexpectedly terminated when it should not be terminated.

BRIEF DESCRIPTION OF THE DRAWINGS

The foregoing and/or further objects, features and advantages of the invention will become more apparent from the following description of a preferred embodiment with reference to the accompanying drawings, in which like numerals are used to represent like elements and wherein.

DETAILED DESCRIPTION OF PREFERRED EMBODIMENTS

A preferred embodiment of the invention will be described in detail with reference to the accompanying drawings.

Figure 1:
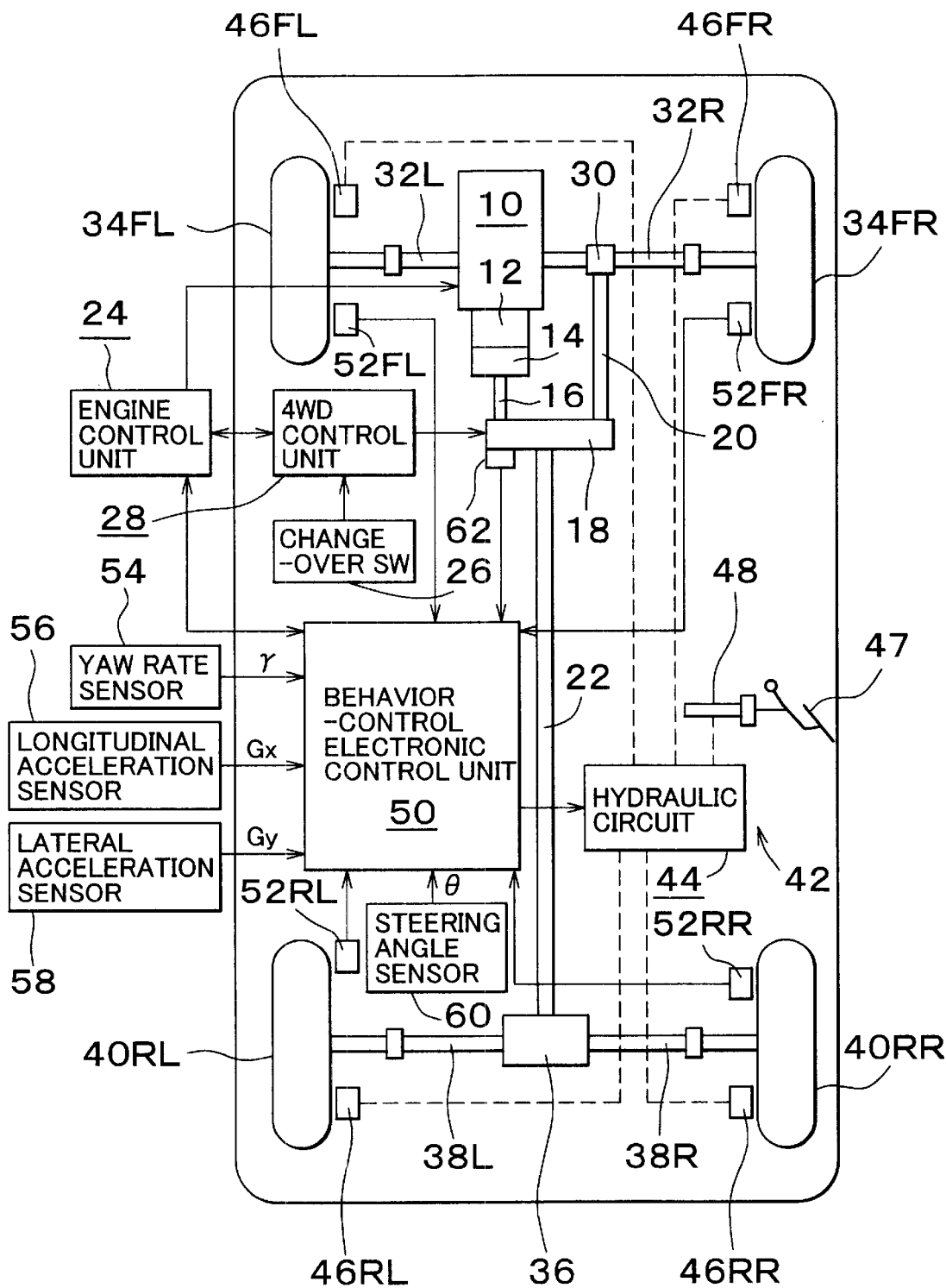
FIG. 1 is a schematic diagram of a four-wheel-drive vehicle, including a braking-force behavior control apparatus that incorporates a vehicle speed estimating apparatus according to a preferred embodiment of the invention.

FIG. 1 is a schematic diagram of a four-wheel drive vehicle including a braking-force behavior control apparatus that incorporates a vehicle speed estimating apparatus according to one embodiment of the invention.

Referring to FIG. 1, driving force of an engine 10 is transmitted to an output shaft 16 via a torque converter 12 and a transmission 14. The driving force is then transmitted from the output shaft 16 to a front-wheel propeller shaft 20 and/or a rear-wheel propeller shaft 22 via a transfer 18 that serves as a driving-state switching means. The output of the engine 10 is controlled by an engine control unit 24 in accordance with an amount of depression of an accelerator pedal (not shown in FIG. 1) operated by a vehicle driver, and so on.

The transfer 18 includes an actuator that switches the driving state of the vehicle between four-wheel drive (4WD) and two-wheel drive (2WD) states. The actuator is controlled by a 4WD control unit 28 in response to an operated position of a change-over switch (SW) 26 that is operated by the driver. If the change-over switch 26 is in a 4WD position, the transfer 18 is placed or set in a 4WD position for transmitting the driving force of the output shaft 16 to the front-wheel propeller shaft 20 and the rear-wheel propeller shaft 22. If the change-over switch 26 is in a 2WD position, the transfer 18 is placed or set in a 2WD position for transmitting the driving force of the output shaft 16 only to the rear-wheel propeller shaft 22. The transfer 18 may be designed to be placed in a 2WD position for transmitting the driving force of the output shaft 16 only to the front-wheel propeller shaft 20 when the change-over switch 26 is in the 2WD position.

As shown in FIG. 1, the 4WD control unit 28 supplies the engine control unit 24 with a signal indicating whether the 4WD control unit 28 has commanded the transfer 18 to be placed in the 2WD or 4WD position, based on a command signal received from the change-over switch 26. In accordance with the position of the transfer 18 commanded by the 4WD control unit 28, the engine control unit 24 controls the output of the engine 10.

The driving force of the front-wheel propeller shaft 20 is transmitted to a front-left axle 32L and a front-right axle 32R via a front-wheel differential 30, so as to drive or rotate a front-left wheel 34FL and a front-right wheel 34FR. Likewise, the driving force of the rear-wheel propeller shaft 22 is transmitted to a rear-left axle 38L and a rear-right axle 38R via a rear-wheel differential 36, so as to drive or rotate a rear-left wheel 40RL and a rear-right wheel 40RR.

Braking pressures in wheel cylinders 46FL, 46FR, 46RL, 46RR corresponding to the front-left, front-right, rear-left and rear-right wheels 34FL, 34FR, 40RL, 40RR, respectively, are controlled by a hydraulic circuit 44 of a braking unit 42, so that braking forces applied to these front and rear wheels 34FL, 34FR, 40RL, 40RR are controlled. Although not shown, the hydraulic circuit 44 includes a reservoir, an oil pump, various valve devices, and so on. The braking pressure in each of the wheel cylinders is normally controlled by a master cylinder 48 that is driven in accordance with an operation of a brake pedal 47 by the vehicle driver. When appropriate, the braking pressure is controlled as needed by a behavior-control electronic control unit 50 as will be described later in detail.

The electronic control unit 50 receives signals indicative of wheel speeds $V_{fl}$, $V_{fr}$, $V_{rl}$, $V_{rr}$ of the front-left, front-right, rear-left and rear-right wheels from respective wheel speed sensors 52FL, 52FR, 52RL, 52RR. The electronic control unit 50 also receives a signal indicative of the yaw rate $\gamma$ of the vehicle from a yaw rate sensor 54, and signals indicative of the longitudinal acceleration $G_x$ of the vehicle and the lateral acceleration $G_y$ of the vehicle from a longitudinal acceleration sensor 56 and a lateral acceleration sensor 58, respectively. The electronic control unit 50 further receives a signal indicative of a steering angle θ from a steering angle sensor 60. The yaw rate sensor 54, lateral acceleration sensor 58 and the steering angle sensor 60 detect a yaw rate, a lateral acceleration, and a steering angle, respectively, which assume positive values when the vehicle makes a left turn, and the longitudinal acceleration sensor 56 detects a longitudinal acceleration, which assumes a positive value when the vehicle runs in an accelerating direction.

The electronic control unit 50 receives, from the engine control unit 24, a signal indicating whether the transfer 18 is in the 2WD position or in the 4WD position, and also receives, from a driving state detecting switch 62 provided at the transfer 18, a signal indicating whether the transfer 18 is in the 2WD position or in the 4WD position. The engine control unit 24, the 4WD control unit 28, and the electronic control unit 50 may be actually constituted by a microcomputer including, for example, a CPU, a ROM, a RAM, and I/O devices, and a driving circuit or circuits.

Thus, the engine control unit 24 and the driving state detecting switch 62 function to acquire or obtain information on a driving state of the vehicle. In particular, the driving state detecting switch 62 detects an operating state of the transfer 18 that serves to switch the driving state of the vehicle, and the engine control unit 24 acquires information on a switching command that is transmitted to the transfer 18.

Figure 2:
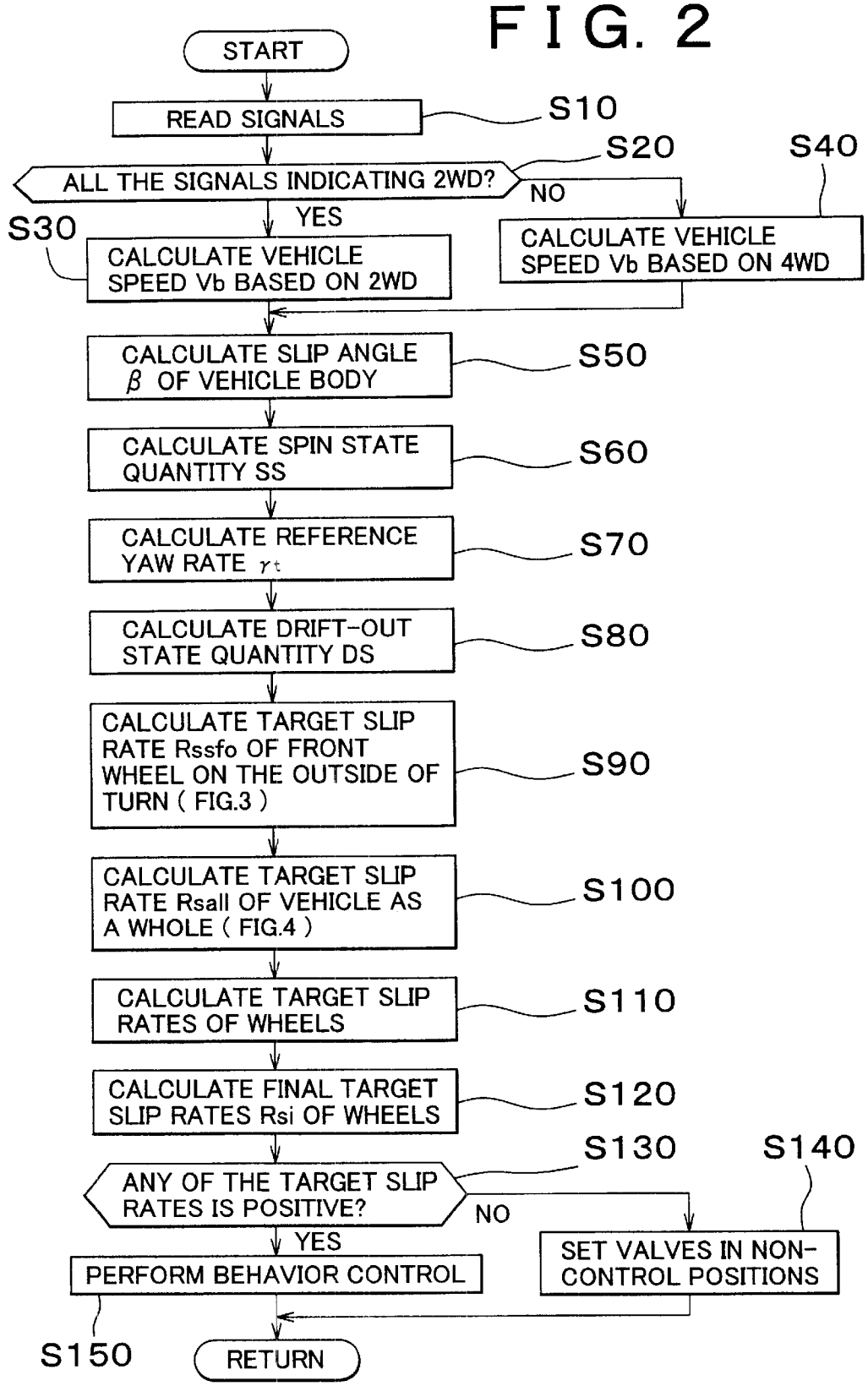
FIG. 2 is a flowchart showing a routine of vehicle speed estimation and behavior control according to the preferred embodiment.

As will be described later in detail, the electronic control unit 50 performs various operations according to a routine as shown in FIG. 2, based on parameters detected by the above-mentioned various sensors, and estimates a vehicle speed and determines a turning behavior of the vehicle. If the vehicle is in a spin state or a drift-out state, the electronic control unit 50 calculates a target slip rate of a wheel to which a braking force is applied to stabilize the turning behavior, using a wheel speed of the front wheel on the inside of the turn as a reference wheel speed. The wheel(s) to which the braking force is to be applied will be hereinafter called "controlled wheel(s)". The electronic control unit 50 then controls the braking force applied to the controlled wheel so that the slip rate of the controlled wheel becomes equal to the target slip rate. With the braking force thus controlled, yawing moment is applied to the wheel in such a direction as to suppress or prevent spin or drift-out, and at the same time the vehicle is decelerated with its behavior being stabilized.

In the embodiment as shown in FIG. 1, in particular, the electronic control unit 50 determines whether the vehicle is in the 2WD state or in the 4WD state, based on a signal received from the engine control unit 24 indicating the operating position of the transfer 18, and a signal received from the driving state detecting switch 62 indicating the operating position of the transfer 18. If the electronic control unit 50 determines that the vehicle is in the 2WD state, the higher one of the wheel speeds $V_{fl}$, $V_{fr}$ of the front-left and front-right wheels as non-driven wheels is set as a vehicle speed $V_b$. If the electronic control unit 50 determines that the vehicle is not in the 2WD state or cannot determine whether the vehicle is in the 2WD state, the lowest one of the wheel speeds $V_{fl}$, $V_{fr}$, $V_{rl}$, $V_{rr}$ is set as the vehicle speed $V_b$, which is to be used for various calculations.

Next, the routine of vehicle speed estimation and behavior control according to the instant embodiment will be described with reference to a flowchart as shown in FIG. 2. The control process according to the flowchart of FIG. 2 is initiated upon a closing (ON) of an ignition switch (not shown) and is performed repeatedly at predetermined time intervals.

After the control process begins, control proceeds to step 10 to read a signal indicating a yaw rate γ of the vehicle detected by the yaw rate sensor 54, and other signals. Then, in step 20, the controller determines whether the vehicle is in the 2WD state, based on a signal from the engine control unit 24 and a signal from the driving state detecting switch 62. If an affirmative decision (YES) is obtained in step 20, i.e., if it is determined that the vehicle is in the 2WD state, the higher one of the wheel speeds $V_{fl}$, $V_{fr}$ of the front-left and front-right wheels as non-driven wheels is set as the vehicle speed $V_b$ in step 30. If a negative decision (NO) is obtained in step 20, i.e., if it is not determined that the vehicle is in the 2WD state, the lowest one of the wheel speeds $V_{fl}$, $V_{fr}$, $V_{rl}$, $V_{rr}$ is set as the vehicle speed $V_b$ in step 40.

In step 20, the electronic control unit 50 determines that the vehicle is in the 2WD state when both the signal from the engine control unit 24 and the signal from the driving state detecting switch 62 indicate that the vehicle is in the 2WD position. On the contrary, the electronic control unit 50 determines that the vehicle is not in the 2WD state or cannot determine whether the vehicle is in the 2WD state in the following cases: 1) where both the signal from the engine control unit 24 and the signal from the driving state detecting switch 62 indicate that the vehicle is in the 4WD position, 2) where the operating position of the transfer 18 as indicated by the signal from the engine control unit 24 is different from that as indicated by the signal from the driving state detecting switch 62, and 3) where the operating position of the transfer 18 cannot be identified or recognized from the signal received from the engine control unit 24, or the signal received from the driving state detecting switch 62, due to a failure or other abnormality in a signal communication system, or the like.

If the vehicle speed $V_b$ is set in steps 30 and 40 while behavior control is being performed and a braking force is being applied under the behavior control to the controlled wheel, the vehicle speed $V_b$ is set on the basis of the wheel speeds, except for the wheel speed of the controlled wheel, and thus the vehicle speed is prevented from being estimated to be lower than its actual value.

More specifically, if it is determined in step 20 that the vehicle is in the 2WD state while spin control is being performed, then vehicle speed $V_b$ is set in step 30 to the wheel speed of one of the front-right and front-left wheels that is not the controlled wheel on the outside of the turn, i.e., to the wheel speed of the front wheel on the inside of the turn. If it is determined in step 20 that the vehicle is not in the 2WD state or it cannot be determined whether the vehicle is in the 2WD state while spin control is being performed, the vehicle speed $V_b$ is set in step 40 to the wheel speed of one of the wheels that is not the controlled wheel on the outside of the turn, i.e., to the lowest one of the wheel speed of the front wheel on the inside of the turn and the wheel speeds $V_{rr}$, $V_{rl}$ of the rear-right and rear-left wheels.

If it is determined in step 20 that the vehicle is in the 2WD state while drift-out control is being performed in which the rear-right and rear-left wheels are controlled wheels, the vehicle speed $V_b$ is set in step 30 to the higher one of the wheel speeds $V_{fr}$, $V_{fl}$ of the front-right and front-left wheels, as in the case where drift-out control is not performed. If it is determined in step 20 that the vehicle is not in the 2WD state or it cannot be determined whether the vehicle is in the 2WD state while drift-out control is being performed, the vehicle speed $V_b$ is set in step 40 to the wheel speed of one of the wheels excluding the rear-right and rear-left wheels as the controlled wheels, i.e., the lower one of the wheel speeds $V_{fr}$, $V_{fl}$ of the front-right and front-left wheels.

In step 50, a lateral acceleration difference, i.e., a sideslip acceleration $V_{yd}$ of the vehicle, is calculated as a difference $(G_y-V_b \cdot \gamma)$ between a lateral acceleration $G_y$ and a product of the vehicle speed $V_b$ and the yaw rate $\gamma$. The sideslip acceleration $V_{yd}$ is integrated so that a sideslip speed $V_y$ of the vehicle is calculated. Furthermore, a slip angle $\beta$ of the vehicle is calculated as a ratio $V_y/V_x$ of the sideslip speed $V_y$ of the vehicle to a longitudinal speed $V_x$ of the vehicle (=the vehicle speed $V_b$).

In step 60, a spin amount SV is calculated as a linear sum $(K1 \cdot \beta + K2 \cdot V_{yd})$ of the slip angle $\beta$ and the sideslip acceleration $V_{yd}$ of the vehicle, using positive constants K1 and K2. Depending upon whether the yaw rate $\gamma$ is positive or negative, it is determined whether the vehicle is making a left turn or a right turn. A spin state quantity SS is calculated as being equal to SV if the vehicle is turning left, and as being equal to –SV if the vehicle is turning right. When the result of this calculation is a negative value, the spin state quantity is made equal to 0. The spin amount SV may be calculated as a linear sum of the slip angle $\beta$ of the vehicle and its derivative $\beta_d$.

In step 70, a target yaw rate $\gamma_c$ is calculated according to an equation (1) as indicated below, in which $K_h$ is stability factor, H is wheel base, and $R_g$ is steering gear ratio. Then, a reference yaw rate $\gamma_t$ is calculated according to an equation (2) as indicated below, in which T is time constant and s is Laplace operator. Taking a dynamic yaw rate into account, the target yaw rate $\gamma_c$ may be calculated in view of the lateral acceleration $G_y$ of the vehicle.

$$\gamma_c = V_b \cdot \theta / (1 + K_h \cdot V_b^2) \cdot H/R_g \quad (1)$$

$$\gamma_t = \gamma_c / (1 + T \cdot s) \quad (2)$$

In step 80, a drift value DV is calculated according to an equation (3) as indicated below, and it is determined, based on the sign, i.e., positive or negative, of the yaw rate $\gamma$, whether the vehicle is making a left turn or a right turn. The drift-out state quantity DS is calculated as being equal to DV if the vehicle is turning left, and as being equal to –DV if the vehicle is turning right. When the result of this calculation is a negative value, the drift-out state quantity is made equal to 0. The drift-out value DV may also be calculated according to an equation (4) as indicated below.

$$DV = (\gamma_t - \gamma) \quad (3)$$

$$DV = H \cdot (\gamma_t - \gamma)/V \quad (4)$$

Figure 3:
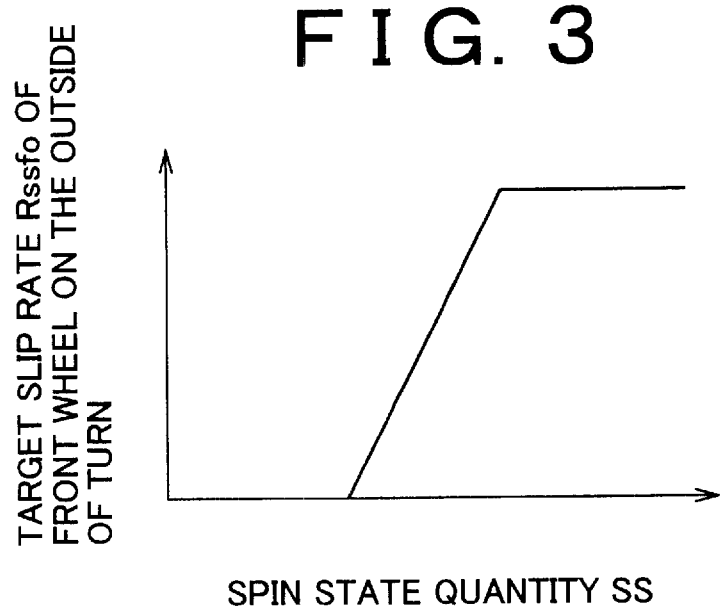
FIG. 3 is a graph showing a relationship between spin state quantity SS and target slip rate $R_{ssfo}$ of a front wheel on the outside of a turn.
Figure 4:
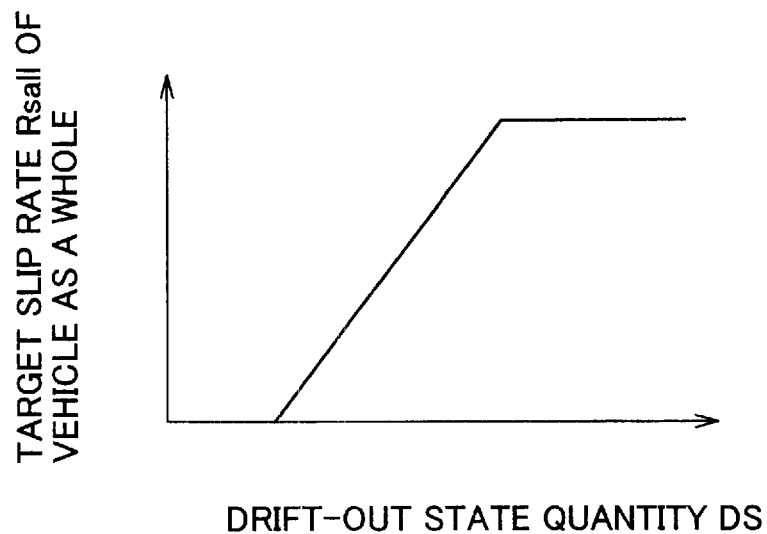
FIG. 4 is a graph showing a relationship between drift-out state quantity DS and target slip rate $R_{sall}$ of the vehicle as a whole.

In step 90, a target slip rate $R_{ssfo}$ of the front wheel on the outside of the turn is calculated based on the spin state quantity SS, using a map corresponding to a graph as shown in FIG. 3. In step 100, a target slip rate $R_{sall}$ of the vehicle as a whole is calculated based on the drift-out state quantity DS, using a map corresponding to a graph as shown in FIG. 4.

In step 110, target slip rates $R_{sfo}$, $R_{sfi}$, $R_{sro}$, $R_{sri}$ of the front wheel on the outside of the turn, the front wheel on the inside of the turn, the rear wheel on the outside of the turn, and the rear wheel on the inside of the turn, respectively, are calculated according to an equation (5) as indicated below, in which $K_{ri}$ is distribution ratio ($0.5 \leq K_{ri} < 1$) for one of the rear-right and rear-left wheels that is on the inside of the turn.

$R_{sfo} = R_{ssfo}$ $R_{sfi} = 0$ $R_{sro} = (1-K_{ri}) \cdot R_{sall}$ $R_{sri} = K_{ri} \cdot R_{sall} \quad (5)$ In step 120, the wheels on the inside and outside of the turn are identified by determining the turning direction of the vehicle based on the sign, i.e., positive or negative, of the yaw rate $\gamma$, and final target slip rates $R_{si}$ ($i=fl, fr, rl, rr$) of the wheels are determined based on the result of the identification. That is, the final target slip rates $R_{si}$ are obtained according to equations (6) as indicated below when the vehicle turns left, and are obtained according to equations (7) as indicated below when the vehicle turns right.

$R_{sfr} = R_{sfo}$ $R_{sfl} = R_{sfi}$ $R_{srr} = R_{sro}$ $R_{srl} = R_{sfo} \quad (6)$ $R_{sfr} = R_{sfi}$ $R_{sfl} = R_{sfo}$ $R_{srr} = R_{sri}$ $R_{srl} = R_{sro} \quad (7)$ In step 130, it is determined whether any one of the final target slip rates $R_{si}$ is positive (whether all the final target slip rates $R_{si}$ are not equal to 0), i.e., whether behavior control is necessary. If an affirmative decision (YES) is obtained in step 130, then control proceeds to step 150. If a negative decision (NO) is obtained in step 130, then control proceeds to step 140 in which each valve device, or the like, is set in a non-control position, and then returns to step 10 without performing behavior control.

In step 150, braking forces are controlled such that the slip rates of the respective wheels become equal to the final target slip rates $R_{si}$ that have been set in step 120, whereby behavior control is performed. Control then returns to step 10.

According to the illustrated embodiment of the invention, if the turning behavior of the vehicle is stable, a negative decision (NO) is obtained in step 130, and control proceeds to step 140 in which the respective valve devices, or the like, are set in non-control positions. Control then returns to step 10. In this case, behavior control of step 150 is not performed, and thus, braking pressures applied to the respective wheels are controlled in accordance with an amount of depression of the driver-operated brake pedal 12.

If the turning behavior of the vehicle is unstable, an affirmative decision (YES) is obtained in step 130, and behavior control is performed in step 150. Thus, the turning behavior of the vehicle is stabilized. More specifically, a spin state quantity is calculated based on the slip angle $\beta$ of the vehicle body and other parameter(s), a drift-out state quantity is calculated based on the actual yaw rate $\gamma$ and other parameter(s), and braking forces applied to the respective wheels are controlled based on both the spin state quantity and the drift-out state quantity. Thus, regardless of whether the vehicle is in a spin state or in a drift-out state, unstable behavior of the vehicle is suppressed.

In the process of FIG. 2, it is determined in step 20 whether the vehicle is in the 2WD state or in the 4WD state, based on the signal received from the engine control unit 24 and the signal received from the driving state detecting switch 62. If it is determined that the vehicle is in the 2WD state, the vehicle speed $V_b$ is set in step 30 to the higher one of the wheel speeds $V_{fr}$, $V_{fl}$ of the front-right and front-left wheels as non-driven wheels. If it is determined that the vehicle is not in the 2WD state, the lowest one of the wheel speeds $V_{fl}$, $V_{fr}$, $V_{rl}$, $V_{rr}$ is set as the vehicle speed $V_b$ in step 40.

Thus, when the vehicle is actually in the 2WD state, it is determined in step 20 that the vehicle is in the 2WD state, and the vehicle speed $V_b$ is set in step 30 to the higher one of the wheel speeds $V_{fl}$, $V_{fr}$ of the front-left and front-right wheels that are free from an influence of the driving force and are less likely to be influenced by road-surface resistance. When the vehicle is actually in the 4WD state, it is determined in step 20 that the vehicle is not in the 2WD state. In this case, step 40 is executed to set the vehicle speed $V_b$ to one of the wheel speeds $V_{fl}$, $V_{fr}$, $V_{rl}$, $V_{rr}$ which is least influenced by the driving force, namely, which has the smallest influence of the driving force. Thus, the vehicle speed $V_b$ can be accurately calculated irrespective of the driving state of the vehicle.

If the actual operating position of the transfer 18 is the 4WD position while the command signal from the 4WD control unit 28 indicates that the transfer 18 should be in the 2WD position, due to, for example, a failure or abnormality in the actuator of the transfer 18 or the signal communication system, the signal indicating the operating position of the transfer 18 and received from the engine control unit 24 does not coincide with the signal indicating the operating position of the transfer 18 and received from the driving state detecting switch 62. In this case, it cannot be determined in step 20 that the vehicle is in the 2WD state.

Thus, in the circumstance where the vehicle speed $V_b$ should be naturally set to the lowest one of the wheel speeds $V_{fl}$, $V_{fr}$, $V_{rl}$, $V_{rr}$ (since the vehicle is actually in the 4WD state), the vehicle speed $V_b$ is prevented from being set to the higher one of the wheel speeds $V_{fl}$, $V_{fr}$ of the front-left and front-right wheels as driven wheels, and thus becoming higher than its actual value. As a result, the slip angle $\beta$ of the vehicle body and the reference yaw rate $\gamma_t$ of the vehicle will be calculated not to be greater than their actual values. Thus, behavior control will not be applied when the actual behavior of the vehicle is relatively stable and behavior control should not be applied. If the behavior control is performed in other situations, the same control will be terminated when it should be terminated.

If the actual operating position of the transfer 18 is the 2WD position while the command signal from the 4WD control unit 28 indicates that the transfer 18 should be in the 4WD position, due to, for example, a failure or abnormality in the actuator of the transfer 18 or the signal communication system, the signal received from the engine control unit 24 does not coincide with the signal from the driving state detecting switch 62. Therefore, it cannot be determined in step 20 that the vehicle is in the 2WD state.

In this case, since the front-left and front-right wheels are actually non-driven wheels, and the wheel speeds of these front wheels are lower than those of the rear-left and rear-right wheels as driven wheels, the vehicle speed $V_b$ is set to the lower one of the wheel speeds $V_{fl}$, $V_{fr}$ of the front-left and front-right wheels. Thus, the vehicle speed $V_b$ is prevented from being estimated to be higher than its actual value based on the wheel speeds of the rear-left and rear-right wheels as driven wheels, and the aforementioned problems that would be otherwise caused by the erroneous estimation can be thus avoided.

In the illustrated embodiment, in particular, if the vehicle speed $V_b$ is estimated in steps 30 and 40 while behavior control is being performed, the wheel speed(s) of the controlled wheel(s) is/are excluded from the wheel speeds based on which the vehicle speed $V_b$ is set or determined. This process can surely avoid a situation where the vehicle speed is estimated to be lower than its actual value based on the wheel speed of the controlled wheel that has been greatly reduced due to a braking force applied to the wheel under behavior control. Thus, the behavior of the wheels can be estimated with improved accuracy. In addition, behavior control will be started without fail when it should be started, and will not be terminated when it should not be terminated.

In the illustrated embodiment, both the engine control unit 24 and the driving state detecting switch 62 serve as means for acquiring or obtaining information relating to the driving state of the vehicle. Namely, the driving state of the vehicle is determined from a combination of signals from the engine control unit 24 and the driving state detecting switch 62. Therefore, the driving state of the vehicle can be more accurately determined as compared with the case where only a single component serves to acquire the above information. Consequently, the vehicle speed or vehicle body speed can be estimated with improved accuracy.

In the illustrated embodiment in which braking-force behavior control is performed as needed, a braking force is applied to the front wheel on the outside of a turn when the vehicle is in a spin state and braking forces are applied to the rear-left and rear-right wheels when the vehicle is in a drift-out state. However, the behavior control is not limited to that of the illustrated embodiment. For example, braking forces may be applied to the front wheel and rear wheel both located on the outside of a turn when the vehicle is in a spin state, and a braking force may be applied to the rear wheel on the inside of a turn or braking forces may be applied to the three wheels other than the front wheel on the inside of the turn when the vehicle is in a drift-out state.

While the braking-force behavior control is performed using the vehicle speed estimated according to the invention in the illustrated embodiment, traction control may be performed based on the estimated vehicle speed. In this case, the estimated vehicle speed is used as a reference speed based on which slip rates or slip amounts that indicate a degree of slip of driven wheels are calculated. Also in this case, since the wheel speeds of the wheels to which braking forces are applied under traction control do not become excessively lower than the vehicle speed, the wheel speeds of the wheels to which braking forces are applied under traction control are not excluded for use in calculating the vehicle speed.

In the illustrated embodiment, the vehicle speed $V_b$ is set to the higher one of the wheel speeds of the front-left and front-right wheels as non-driven wheels when the vehicle is in the 2WD state. Instead, the vehicle speed $V_b$ may be set to the lower one of the wheel speeds of the non-driven wheels, or to the average of the wheel speeds of the non-driven wheels. In the illustrated embodiment, the vehicle speed $V_b$ is set to the lowest one of the wheel speeds of all of the wheels when the vehicle is in the 4WD state. Instead, the vehicle speed $V_b$ may be set to the second lowest one of the wheel speeds of all of the wheels or set to the average of the lowest one and the second lowest one of the wheel speeds of all of the wheels. Furthermore, the vehicle speed $V_b$ may be set to the lowest one of the wheel speeds of all of the wheels when the vehicle speed is in a relatively low range, and may be set to the second lowest one of the wheel speeds of all of the wheels when the vehicle speed is in a relatively high range.

In the illustrated embodiment, the transfer is provided for switching the driving state of the vehicle between an all-wheel driving state in which all of the wheels are driven wheels, and a selected-wheel driving state in which only selected ones of the wheels are driven wheels. More specifically, the 4WD control unit 28 controls the actuator of the transfer 18, base on the position of the change-over switch 26 operated by the driver, such that the operating position of the transfer 18 switches between the 2WD position and the 4WD position. However, other means or methods may be employed for switching the driving state of the vehicle. For example, a suitable driving state is selected by the engine control unit, depending upon the running conditions of the vehicle, and the vehicle driving state may be automatically switched based on the result of the selection. In a further example, the transfer may be switched by means of a switching or change-over lever that is manipulated by the vehicle driver.

Furthermore, in the illustrated embodiment, the engine control unit 24 and the driving state detecting switch 62 serve as information sources from which information regarding the driving state of the vehicle can be acquired or obtained. However, the invention is not limited to this arrangement. For example, the information regarding the driving state of the vehicle may be acquired from a combination of the 4WD control unit 28 and the driving state detecting switch 62, or a combination of the change-over switch 26 and the driving state detecting switch 62. Furthermore, the information on the vehicle driving state may be acquired from three or more components or elements, or may be acquired from a single component or element.

As is apparent from the foregoing description, the vehicle speed estimating apparatus according to the invention can prevent the vehicle speed from being estimated based on the wheel speeds of wheels that are actually driven wheels but are falsely judged as non-driven wheels, and a situation that the vehicle speed is estimated to be higher than an actual value because of the misjudgment. Therefore, even in the case where the actual driving state of the vehicle is different from the result of determination on the driving state, the vehicle speed can be estimated with improved accuracy. Further, the control apparatus according to the invention is able to perform predetermined control, such as behavior control, more appropriately than before, by using the accurately estimated vehicle speed, even in the case where the actual driving state of the vehicle is different from the result of determination on the driving state. This performance results in reduced possibilities that the predetermined control is unexpectedly applied in a situation where it should not be applied, the predetermined control fails to be terminated in a situation where it should be terminated, the predetermined control fails to be applied when it should be applied, and the predetermined control is unexpectedly terminated when it should not be terminated.

In the illustrated embodiment, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to its preferred embodiment, it is to be understood that the invention is not limited to the preferred embodiment or construction. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. An apparatus for estimating a vehicle speed of a vehicle in which a driving state can be switched between an all-wheel driving state where all wheels of the vehicle are driven wheels, and a selected-wheel driving state where a first group of wheels are driven wheels and a second group of wheels are non-driven wheels, comprising a controller that:

determines the driving state of the vehicle;

calculates the vehicle speed based on at least a wheel speed of at least one of the non-driven wheels when it is determined that the driving state is the selected-wheel driving state; and when it is determined that the driving state is not the selected-wheel driving state or when it cannot be determined that the driving state is the selected-wheel driving state, calculates the vehicle speed based on at least a wheel speed of at least one of the wheels of the vehicle, the number of the at least one of the wheels being equal to or smaller than that of the non-driven wheels (N), and the at least one of the wheels having the lowest to the Nth lowest one of the wheel speeds of all of the wheels.

2. The apparatus according to claim 1, wherein the controller calculates the vehicle speed based on the wheel speed of the at least one of the wheels having the lowest to the Nth lowest one of the wheel speeds of all of the wheels, when the controller determines that the driving state of the vehicle is the all-wheel driving state, or that the driving state is neither the all-wheel driving state nor the selected-wheel driving state.

3. The apparatus according to claim 1, wherein the controller calculates the vehicle speed based on the lowest one of the wheel speeds of all of the wheels, when it is determined that the driving state is not the selected-wheel driving state or when it cannot be determined that the driving state is the selected-wheel driving state.

4. The apparatus according to claim 1, wherein the controller calculates the vehicle speed based on the higher one of the wheel speeds of the non-driven wheels when it is determined that the driving state is the selected-wheel driving state.

5. The apparatus according to claim 1, wherein the controller acquires information regarding the driving state of the vehicle, and determines the driving state of the vehicle based on the acquired information.

6. The apparatus according to claim 5, wherein the controller acquires a plurality of pieces of information regarding the driving state of the vehicle, from a plurality of information sources, and determines that the driving state is the selected-wheel driving state when all of the pieces of information indicate that the selected-wheel driving state is established.

7. The apparatus according to claim 6, wherein:
the vehicle includes a switching device that switches the driving state between the all-wheel driving state and the selected-wheel driving state; and
the plurality of information sources comprise a first source that detects an operating state of the switching device, and a second source that provides information regarding a switching command that is supplied to the switching device.

8. A control apparatus for performing predetermined control on a vehicle in which a driving state can be switched between an all-wheel driving state where all wheels of the vehicle are driven wheels, and a selected-wheel driving state in which a first group of wheels are driven wheels and a second group of wheels are non-driven wheels, comprising a controller that:
determines the driving state of the vehicle;
estimates the vehicle speed based on at least a wheel speed of at least one of the non-driven wheels when it is determined that the driving state is the selected-wheel driving state;
when it is determined that the driving state is not the selected-wheel driving state or when it cannot be determined that the driving state is the selected-wheel driving state, estimates the vehicle speed based on at least a wheel speed of at least one of the wheels of the vehicle, the number of the at least one of the wheels being equal to or smaller than that of the non-driven wheels (N), the at least one of the wheels having the lowest to the Nth lowest one of the wheel speeds of all of the wheels; and
performs the predetermined control by using the estimated vehicle speed.

9. The control apparatus according to claim 8, wherein:
the controller performs braking-force behavior control as the predetermined control, by applying a braking force to at least one of the wheels when the vehicle undergoes an undesirable behavior, so as to suppress the undesirable behavior; and
the controller estimates at least one quantity representing a behavior of the vehicle by using the estimated vehicle speed.

10. The control apparatus according to claim 9, wherein the controller estimates the vehicle speed during execution of the behavior control, based on a wheel speed of at least one wheel that excludes the at least one of the wheels to which the braking force is applied under the behavior control.

11. The control apparatus according to claim 8, wherein:
the controller performs traction control as the predetermined control; and
the controller determines a degree of a slip of at least one driven wheel, based on the estimated vehicle speed as a reference speed, and applies a braking force to the at least one driven wheel through the traction control so as to suppress the slip when the degree of the slip is greater than a predetermined level.

12. The control apparatus according to claim 11, wherein the controller estimates the vehicle speed during execution of the traction control, based on a wheel speed of at least one wheel that does not exclude the at least one driven wheel to which the braking force is applied under the traction control.

13. A method of estimating a vehicle speed of a vehicle in which a driving state can be switched between an all-wheel driving state where all wheels of the vehicle are driven wheels, and a selected-wheel driving state in which a first group of wheels are driven wheels and a second group of wheels are non-driven wheels, comprising the steps of:
determining the driving state of the vehicle;
calculating the vehicle speed based on at least a wheel speed of at least one of the non-driven wheels when it is determined that the driving state is the selected-wheel driving state; and
when it is determined that the driving state is not the selected-wheel driving state or when it cannot be determined that the driving state is the selected-wheel driving state, calculating the vehicle speed based on at least a wheel speed of at least one of the wheels of the vehicle, the number of the at least one of the wheels being equal to or smaller than that of the non-driven wheels (N), the at least one of the wheels having the lowest to the Nth lowest one of the wheel speeds of all of the wheels.

14. The method according to claim 13, wherein the vehicle speed is calculated based on the wheel speed of the at least one of the wheels having the lowest to the Nth lowest one of the wheel speeds of all of the wheels, when it is determined that the driving state of the vehicle is the all-wheel driving state, or that the driving state is neither the all-wheel driving state nor the selected-wheel driving state.

15. The method according to claim 13, wherein the vehicle speed is calculated based on the lowest one of the wheel speeds of all of the wheels, when it is determined that the driving state is not the selected-wheel driving state or when it cannot be determined that the driving state is the selected-wheel driving state.

16. The method according to claim 13, wherein the vehicle speed is calculated based on the higher one of the wheel speeds of the non-driven wheels when it is determined that the driving state is the selected-wheel driving state.

17. The method according to claim 13, wherein the step of determining the driving state of the vehicle further comprises:
acquiring information regarding the driving state of the vehicle; and
determining the driving state of the vehicle based on the acquired information.

18. The method according to claim 17, wherein a plurality of pieces of information regarding the driving state of the vehicle are acquired from a plurality of information sources, and it is determined that the driving state is the selected-wheel driving state when all of the pieces of information indicate that the selected-wheel driving state is established.

19. The method according to claim 18, wherein:
the vehicle includes a switching device that switches the driving state between the all-wheel driving state and the selected-wheel driving state; and
the plurality of information sources comprise a first source that detects an operating state of the switching device, and a second source that acquires information regarding a switching command that is supplied to the switching device.

20. A method of performing predetermined control on a vehicle in which a driving state can be switched between an all-wheel driving state where all wheels of the vehicle are driven wheels, and a selected-wheel driving state in which a first group of wheels are driven wheels and a second group of wheels are non-driven wheels, comprising the steps of:

determining the driving state of the vehicle;

estimating the vehicle speed based on at least a wheel speed of at least one of the non-driven wheels when it is determined that the driving state is the selected-wheel driving state;

when it is determined that the driving state is not the selected-wheel driving state or when it cannot be determined that the driving state is the selected-wheel driving state, estimating the vehicle speed based on at least a wheel speed of at least one of the wheels of the vehicle, the number of the at least one of the wheels being equal to or smaller than that of the non-driven wheels (N), the at least one of the wheels having the lowest to the Nth lowest one of the wheel speeds of all of the wheels; and performing the predetermined control by using the estimated vehicle speed.

21. The method according to claim 20, wherein:

the predetermined control comprises braking-force behavior control under which a braking force is applied to at least one of the wheels when the vehicle undergoes an undesirable behavior, so as to suppress the undesirable behavior; and at least one quantity representing a behavior of the vehicle is estimated by using the estimated vehicle speed.

22. The method according to claim 21, wherein the vehicle speed is estimated during execution of the behavior control, based on a wheel speed of at least one wheel that excludes the at least one of the wheels to which the braking force is applied under the behavior control.

23. The method according to claim 20, wherein:

the predetermined control comprises traction control; and a degree of a slip of at least one driven wheel is determined based on the estimated vehicle speed as a reference speed, and the traction control is performed by applying a braking force to the at least one driven wheel so as to suppress the slip when the degree of the slip is greater than a predetermined level.

24. The method according to claim 23, wherein the vehicle speed is estimated during execution of the traction control, based on a wheel speed of at least one wheel that does not exclude the at least one driven wheel to which the braking force is applied under the traction control.

* * * * *